United States Patent
Kreuzer et al.

(10) Patent No.: US 9,484,663 B2
(45) Date of Patent: Nov. 1, 2016

(54) DEVICE FOR DIVIDING A BUNDLE OF INSULATED ELECTRICAL CONDUCTORS

(71) Applicant: NEXANS, Paris (FR)

(72) Inventors: Thomas Kreuzer, Neustadt (DE); Andreas Linner, Munich (DE); Roland Fischer, Mantel (DE); Jurgen Dittrich, Altenstadt (DE)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 14/677,158

(22) Filed: Apr. 2, 2015

(65) Prior Publication Data
US 2015/0349453 A1 Dec. 3, 2015

(30) Foreign Application Priority Data
Apr. 15, 2014 (EP) .................................. 14305553

(51) Int. Cl.
| | |
|---|---|
| *H01R 13/52* | (2006.01) |
| *H01R 4/18* | (2006.01) |
| *H01R 4/02* | (2006.01) |
| *B60R 16/02* | (2006.01) |
| *H02G 3/16* | (2006.01) |
| *H02G 3/08* | (2006.01) |

(52) U.S. Cl.
CPC ....... *H01R 13/5202* (2013.01); *B60R 16/0215* (2013.01); *H01R 4/02* (2013.01); *H01R 4/18* (2013.01); *H02G 3/16* (2013.01); *H02G 3/086* (2013.01); *H02G 3/088* (2013.01)

(58) Field of Classification Search
CPC .......... H02G 3/16; H02G 3/08; H02G 3/081; H02G 3/088; H02G 3/26; H02G 3/086; B60R 16/02; B60R 16/023; B60R 16/0222; B60R 16/0239; B60R 16/0215; H05K 5/00; H05K 5/02; H05K 5/064; H01R 4/18; H01R 13/52; H01R 4/02; H01R 13/5202

USPC ............ 174/50, 520, 51, 527, 535, 59, 135, 174/650, 152 G, 153 G, 137 R, 176, 72 A; 16/2.1, 2.2; 439/535, 108, 76.1, 76.2, 439/271, 272, 278; 385/135, 136

See application file for complete search history.

(56) References Cited

U.S. PATENT DOCUMENTS

| | | | |
|---|---|---|---|
| 7,270,485 B1 * | 9/2007 | Robinson ............. | G02B 6/4477 385/136 |
| 8,107,208 B2 * | 1/2012 | Hotchkiss ............. | H05K 5/064 174/50 |
| 8,723,031 B2 * | 5/2014 | Masumoto ............... | H02G 3/08 174/50 |

(Continued)

FOREIGN PATENT DOCUMENTS

JP 2002301998 10/2002

OTHER PUBLICATIONS

Search Report dated 2014.

*Primary Examiner* — Angel R Estrada
(74) *Attorney, Agent, or Firm* — Sofer & Haroun, LLP

(57) ABSTRACT

A device for dividing at least one bundle of insulated electrical conductors is provided, where in the housing, is arranged a contact part, consisting of metal, which protrudes outwardly beyond the profile of the housing and has at its end projecting out of the housing at least one throughhole and at its end located in the housing a connecting element for electrically conductively connecting a conductor. In the assembly position at least one electrical individual line extends through one of the openings into the housing. The line has at least two conductors, wherein one of the conductors is electrically conductively connected to the contact part, while the other conductor of the individual line projects through one of the openings out of the housing.

5 Claims, 1 Drawing Sheet

(56) References Cited

U.S. PATENT DOCUMENTS

| | | | |
|---|---|---|---|
| 8,764,211 B2* | 7/2014 | Fredrickson | B60R 16/0239 174/535 |
| 8,816,222 B2* | 8/2014 | Pimentel | H02G 3/26 174/650 |
| 2007/0267212 A1 | 11/2007 | Nachbauer et al. | |
| 2009/0170356 A1 | 7/2009 | Aizawa | |

\* cited by examiner

DEVICE FOR DIVIDING A BUNDLE OF INSULATED ELECTRICAL CONDUCTORS

RELATED APPLICATION

This application claims the benefit of priority from European Patent Application No. 14 305 533.1, filed on Apr. 15, 2014, the entirety of which is incorporated by reference.

BACKGROUND

1. Field of the Invention

The invention relates to a device for dividing at least one bundle of insulated electrical conductors, in which a plurality of conductors is combined to form a unit, into at least two partial strands, into which a portion of the conductors of the bundle are respectively combined, wherein each portion has housing composed of insulating material in which openings are provided for passing the bundle and the partial strands therethrough.

2. Description of Related Art

Devices of this type are known. They have been used worldwide for many years. A corresponding device can be used in all electrical appliances in which insulated electrical conductors are combined in a bundle to form a unit, which lead to the individual points of use of the respective appliance. Such appliances are, for example, washing machines, dishwashers or switchboards. A preferred field of use, to which also the embodiments described below are directed, are motor vehicles, in the following called "vehicles" for short, in which wiring harnesses or cable sets are arranged which correspond to the aforementioned bundles. The partial strands emanating from the housing of the appliance lead to different electrical users of a vehicle. Aside from the wiring harnesses, a modern vehicle also includes individual lines which for example are each connected to a sensor. Such sensors serve, for example, for monitoring the camshaft or the crankshaft or also the ABS units of a vehicle. The individual lines are placed independently of the wiring harnesses and are also connected to a reference potential, particularly ground potential or mass.

OBJECTS AND SUMMARY

The invention is based on the object of configuring the device mentioned above in such a way that a connection of individual lines within a vehicle can be placed more easily.

In accordance with the invention, this object is met in that
   in the housing is arranged a contact part consisting of metal which protrudes outwardly beyond the profile of the housing and has at its end projecting out of the housing at least one throughhole and at its end located in the housing a connecting element for electrically conductively connecting a conductor, and
   in the assembly position at least one electrical individual line extends through one of the openings in the housing which has at least two conductors, wherein one of the conductors is electrically conductively connected to the contact part, while the other conductor of the individual line extends out of the housing.

This device not only serves for dividing the conductors of at least bundle of conductors, but also simultaneously for receiving and further conducting, as well as for contacting at least one individual line to whose free end advantageously is connected a sensor. The individual line includes at least two conductors, one of which is connected in the assembly position to a reference potential, which advantageously is ground potential or mass, while the other conductor extends further to a monitoring unit or control unit. The conductor of the individual line to be connected to the reference potential is connected within the housing to the contact part mounted in the housing, namely through the connecting element which advantageously is constructed as a crimp connector. When the housing is in the assembly position, including its openings, is closed or sealed in a moisture proof, particularly splash proof, manner, then the connection of the conductor of the individual line to the contact part is also covered in a moisture proof manner and is protected against splash water. In mounting a wiring harness equipped with this device in a vehicle, it is only necessary to fasten a contact part projecting from the housing on a "mass point" of the vehicle. The individual line or the sensor mounted on the individual line is then "grounded" in a simple manner and without additional operations. The contact part is advantageously connected to the mass point by means of a screw, wherein the screw is passed through the throughhole and connected to the mass point.

BRIEF DESCRIPTION OF THE DRAWINGS

An embodiment of the subject matter of the invention is illustrated in the drawings.

DETAILED DESCRIPTION

In the following, the device according to the invention is described with the aid of a wiring harness for a vehicle. A wiring harness has only one bundle of conductors which are divided by means of the device. However, it would also be possible to divide two or more of such bundles in the housing. In addition, only individual line with sensor is illustrated. Advantageously, it has two insulated conductors. The individual line can also have more than two conductors and it is also possible to provide more than one individual line and more than a single conductor can extend through the housing of the device and be connected to the contact part.

Figure 1:
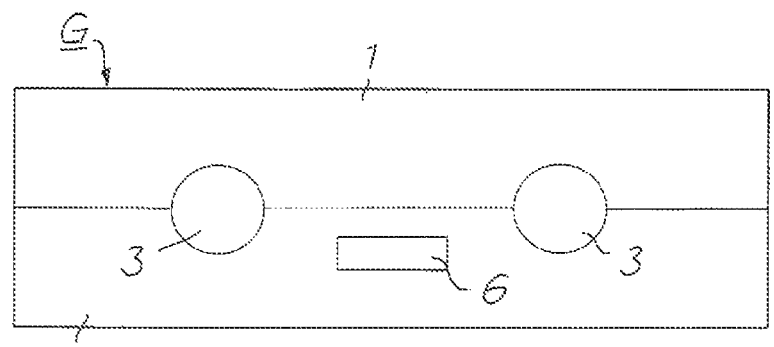
FIG. 1 is a side vies of the device of the invention in a schematic illustration.

In FIG. 1 a housing G consisting of insulating material is schematically illustrated, wherein in the illustrated embodiment the housing has an upper part 1 and a lower part 2. Upper part 1 and lower part 2 are in the mounted position advantageously connected to each other in a moisture proof manner, particularly protected against splash water. However, the housing G can also be constructed of more than two parts which are to be connected to each other.

The housing G has several openings 3 through which electrical conductors can be passed. In FIG. 1, two openings 3 are shown. In the mounted position, all openings 3 of the housing G are closed in a moisture proof manner.

Figure 2:
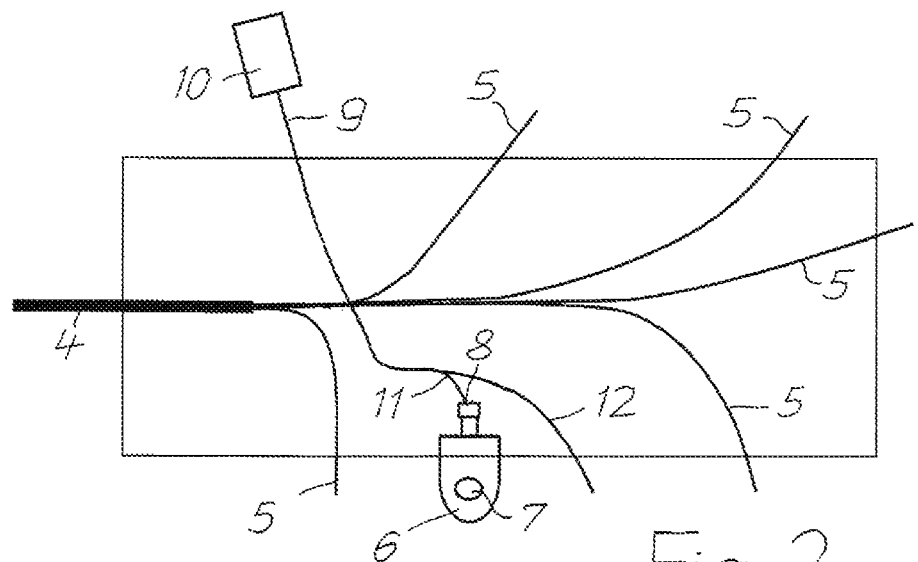
FIG. 2 is a top view of a bottom part of the device according to FIG. 1, also in a schematic illustration.
Figure 3:
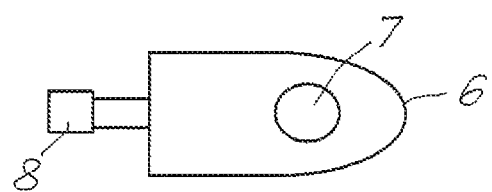
FIG. 3 is an illustration, on a larger scale, of a contact part used in the device.

The housing G serves as a distributor for the insulated electrical conductors of a wiring harness which is to be mounted in a vehicle. For this purpose, in accordance with the illustration in FIG. 2, a bundle 4 of conductors is passed through one of the openings 3 in the housing G. The bundle 4 is to be considered the main strand in which all the conductors are combined into a unit which is to be distributed over the partial strands 5. Consequently, the bundle 4 is indicated by a thicker line, while the partial strands 5 are shown as thinner lines. In the illustrated embodiment, the bundle 4 is distributed over five partial strands which are conducted to the electrical users of the vehicle.

In the wall of the lower part 2 of the housing G is fastened a contact part 6 of metal, preferably of copper or a copper alloy, which advantageously can be formed as a flat strip. The contact element 6 protrudes with one end beyond the profile of the housing G. In the illustrated embodiment, a throughhole 7 is located in the end of the contact part 6. However, it would also be possible to mount two or more throughholes in the contact part 6. At the end protruding into the housing G the contact part 6 has a connecting element 8 for connecting an electric conductor or several conductors. The connecting element 8 is advantageously constructed as a crimp connector or as a welding connector.

In addition to the bundle 4 an individual line 9 extends through one of the openings 3 into the housing G which is connected at its free end, for example, to a sensor 10. The individual line 9 has at least two insulated electrical conductors 11 and 12, wherein one of the conductors 11 is connected in the assembled state to the connecting element 8 of the contact part 6. The conductor 12 extends through one of the openings 3 out of the housing G. It may be connected to a monitoring unit or control unit.

Advantageously, the contact part 6 can, with its end projecting beyond the profile of the housing G in an expansion of the housing G, have its side edges surrounded by the material of the housing G and is fixed in the housing through an appropriate receiving means.

After introducing the bundle 4 into the lower part 2 of the housing G and dividing the bundle into outwardly guided partial strands 5 through the openings 3 of the housing G, as well as arranging the individual line 9 with connection to its conductor 10 to the contact part 6, the housing G is closed by means of the upper part 1. Both parts are connected to each other in a splash water proof manner. All openings 3 are also sealed in a moisture proof manner. Consequently, particularly also the connecting element 8 of the contact part 6 is surrounded in a splash water protected manner with the conductor 11 connected to the contact part 6.

Consequently, the device with the closed housing G, or a wiring harness equipped with the housing G, is completed. After assembly of the device or the wiring harness, the contact part 6 is screwed by means of a screw to a mass point of a vehicle. The sensor 10 is thus grounded without additional operations in a simple manner.

The invention claimed is:

1. Device for dividing at least one bundle of insulated electrical conductors, in which a plurality of conductors is combined into a unit, into at least two partial strands, into which a portion of the conductors of the bundle are respectively combined, each portion has a housing composed of insulating material in which openings are provided for passing the bundle and the partial strands therethrough, said device comprising:

in the housing, a contact part of metal is mounted which protrudes outwardly beyond the profile of the housing and has at its end projecting out of the housing at least one throughhole and at its end located in the housing a connecting element for electrically conductively connecting a conductor, and in the assembly position, at least one electrical individual line extends through one of the openings in the housing which has at least two conductors, one of the conductors is electrically conductively connected to the contact part while the other conductor of the individual line extends out of the housing.

2. Device according to claim 1, wherein the contact part is fastened in a wall of the housing.

3. Device according to claim 1, wherein the contact part with its end containing the throughhole is placed in an expanded portion of the housing and is surrounded at its sides by the material of the side edges.

4. Device according to claim 1, wherein the parts of the housing are connected to each other in the assembly position in moisture proof manner, particularly in a splash water tight manner, and that the openings of the housing with the conductors in the assembly position are sealed in a moisture tight manner, particularly in a splash water tight manner.

5. Device according to claim 1, wherein the contact part serves for the conductor connected thereto as connecting element to a reference potential, particularly an earth potential.

* * * * *